No. 779,064. PATENTED JAN. 3, 1905.
H. F. BLANCHARD.
HYDROCARBON BURNER.
APPLICATION FILED SEPT. 20, 1904.
2 SHEETS—SHEET 1.
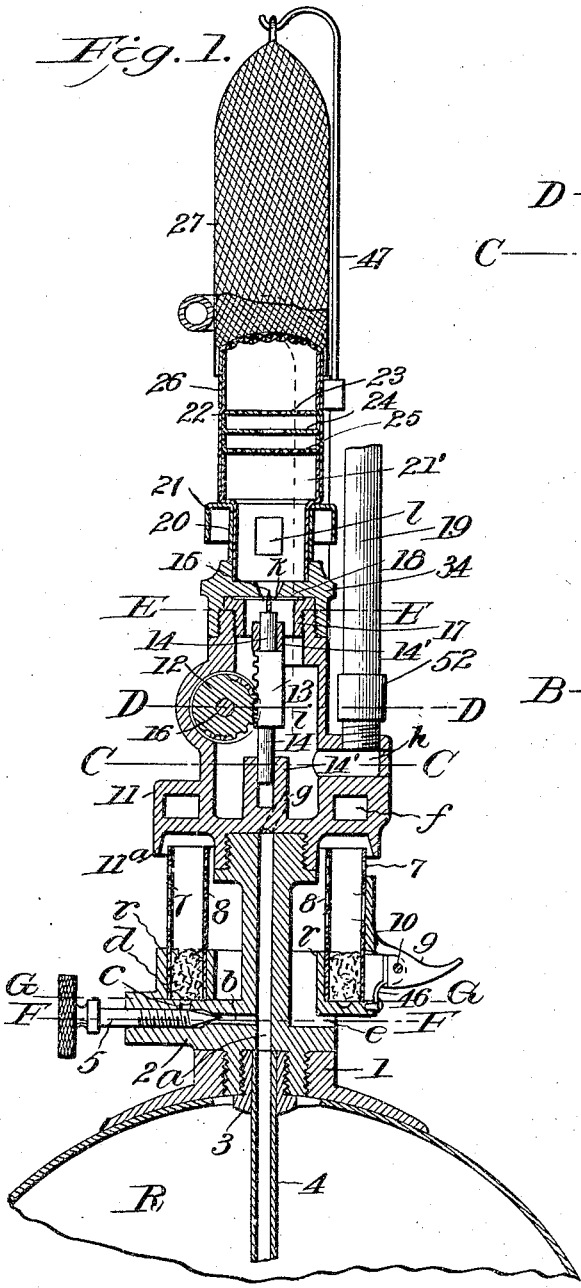
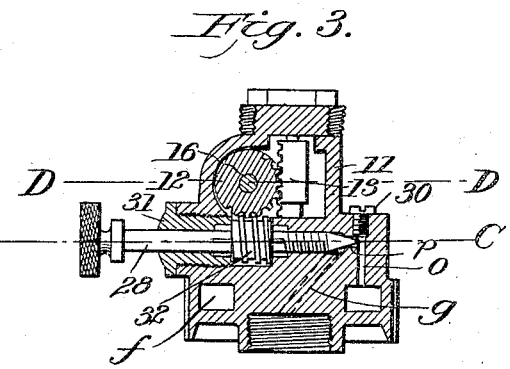
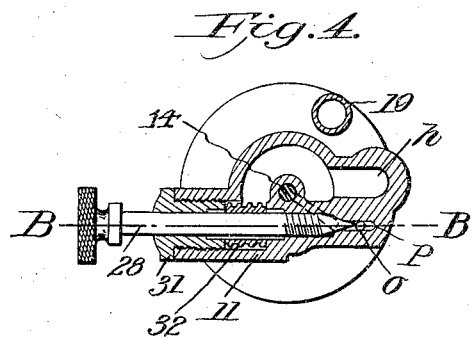
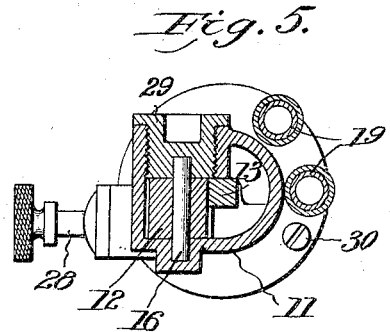
WITNESSES:
C. H. Walker.
C. W. Fowler.
INVENTOR
Harry F. Blanchard
BY
T. Walter Fowler
his Attorney

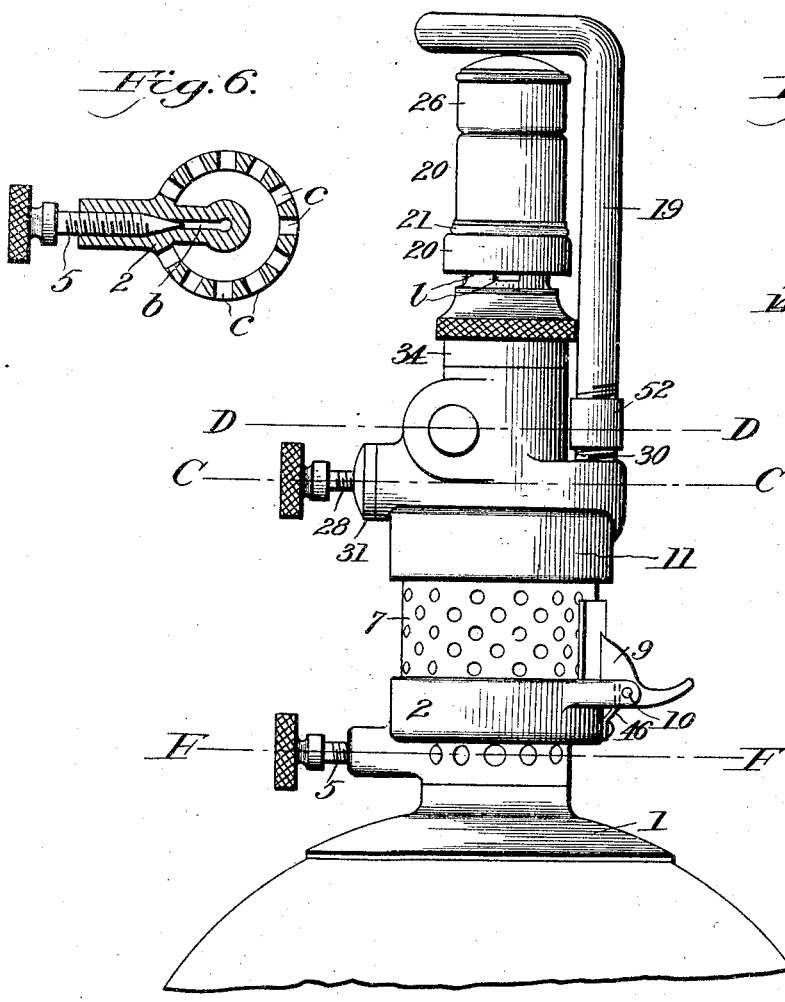

No. 779,064.　　　　　　　　　　　　　　　　　Patented January 3, 1905.

UNITED STATES PATENT OFFICE.

HARRY F. BLANCHARD, OF SOMERVILLE, MASSACHUSETTS.

HYDROCARBON-BURNER.

SPECIFICATION forming part of Letters Patent No. 779,064, dated January 3, 1905.

Application filed September 20, 1904. Serial No. 225,176.

*To all whom it may concern:*

Be it known that I, HARRY F. BLANCHARD, a citizen of the United States, residing at Somerville, in the county of Middlesex and State of Massachusetts, have invented new and useful Improvements in Hydrocarbon-Burners, of which the following is a specification.

This invention relates to certain new and useful improvements in that class of devices now generally known as "hydrocarbon-burners" and wherein a more or less heavy hydrocarbon is vaporized and the resultant gas is mixed with air and the combined vapors utilized for illuminating or heating purposes; and my invention consists of the parts and the constructions, arrangements, and combinations of parts, which I will hereinafter describe and claim.

In the accompanying drawings, forming part of this specification, and in which similar characters of reference indicate like parts throughout the several views, Figure 1 is a vertical sectional view of a hydrocarbon-burner embodying my invention and showing the same in connection with and adapted for illuminating purposes. Fig. 2 is a side elevation of the same with the mantle omitted. Fig. 3 is a vertical section of the casing which incloses the valve mechanism, the gas-chamber, and the vaporizing-chamber, the same being a vertical section on the line B B of Fig. 4. Fig. 4 is a horizontal section on the line C C of Figs. 1, 2, and 3. Fig. 5 is a horizontal section on the line D D of Figs. 1, 2, and 3. Fig. 6 is a horizontal section on the line F F of Figs. 1 and 2. Fig. 7 is a horizontal section on the line G G of Fig. 1. Fig. 8 is a horizontal section on the line E E of Fig. 1.

In carrying out my invention I may use my burner and attachments in connection with any well known and desired form of reservoir or oil-supply and which reservoir may represent the bowl or reservoir R of a lamp or other equivalent vessel, which will be provided with an appropriate nipple 1, to which the burner may be attached. This nipple is designed to have screwed to it a threaded male nipple, which projects from the lower end of the base 2 of the starting-burner structure and which comprises a separate casting with air and oil passages and controlling means, as I will hereinafter describe.

Leading into the oil-reservoir R is an oil-supply pipe 4, fixed to a threaded plug 3, which screws into engagement with a threaded bore or recess in the nipple extension of the base or casting 2. Axially through the base or casting 2 is made an oil-passage $a$, which forms a prolongation of the oil-supply tube, said casting having also in its lower portion a lateral passage $b$ and circumferential air-inlets $e$, said lateral passage being controlled by a valve 5, having a threaded shank and an operating milled head or wheel by which it may be adjusted in and out to regulate and control the oil, which may be allowed to flow through the passage to a channel $c$, leading to an annular channel $d$, formed in the lower portion of the base or casting 2. The annular channel $d$ is at the base of a trough or cup formed by two vertically-disposed concentric rings $r$ $r$, in which trough is placed a wick of asbestos or other absorbent incombustible and indestructible material, which is designed to be saturated by the feed of oil through the oil-passage $a$ and its branch $b$ and the passages $c$ and $d$. The central portion of the base or casting extends some distance above the trough and is of reduced diameter, so as to provide an annular air-space with which the air-inlets $e$ communicate, and the upper end of the reduced central portion has a threaded nipple adapted to be fitted to a companion member on the vaporizer-section, the construction and operation of which I will presently describe.

Surmounting the burner-trough is a chimney formed of concentric rings 7 and 8 of foraminous material or of material provided with numerous holes for the admission of air which is derived both from the outside and from the interior air-space which surrounds the central portion or stem of the base or casting 2, and which air freely mingles with the vapors arising from the wick in the trough, and thereby promotes the combustion of the oil and insures the necessary heat for vaporizing the oil in the superposed vaporizing-chamber. In order to facilitate the ignition of the wick, an opening is made in the outer chimney-ring 7 for the insertion of a lighted match or taper, which opening is normally closed by the plate extension of a lever or finger-piece 9, pivoted at 10 and backed by an appropriate spring, as 46, fixed to the base and having its free end pressing against the heel of the lever or finger-piece. The pressure of the finger upon this lever will depress the spring and allow the lever to rock about its pivotal connection and uncover the match-opening, and when the pressure upon the lever is released the spring will close the plate extension of the lever against said opening, so that it will serve as a closure therefor.

As before stated, the vaporizer-section screws upon the upper threaded end of the central portion or shank of the base-section, and said vaporizer comprises a suitable casting with passages for the admission of oil and the circulation of the vapors generated therefrom. In the base of the vaporizing-section is formed an annular chamber *f*, to which leads a port or passage *g*, that is in open communication with the oil-passage *a* through the central part or stem of the base-section, whereby the oil from the reservoir R will under a suitable pressure that may be given to it flow through the passages *a* and *g* into the vaporizing-chamber *f*, where it is converted into vapor by the heat from the starting-burner formed by the wick and chimney, which are below, and deliver the heat directly against the bottom of the vaporizing-chamber, as shown in Fig. 1, said vaporizer-section 11 having an apron or flange 11ª surrounding the upper part of the chimney 7 8 to better concentrate the heat from the latter against the bottom of the vaporizing-chamber *f*. The vaporizing-section is somewhat enlarged at the base, and it forms a casing around the valve mechanism, gas-chamber, and vaporizing-chamber, to which latter the oil is led by the passage *g*, (which is inclined as shown in Fig. 3,) a lateral channel *p*, and a vertical passage *o*, leading downward through the top of the chamber. A threaded valve 28 is appropriately mounted in a seat in the vaporizer-casing, and this valve controls the flow of oil from the passage *g* to the lateral passage *p*, from which it flows to the aforesaid passage *o* into the vaporizing-chamber. To facilitate the cleansing of the passages *o* and *p*, a screw or other plug 30 is removably fitted in the casing in line with the passage *o*, as shown in Fig. 3. The valve 28 carries a worm 32, which rotates with the stem, but is splined thereto, so that the valve may move longitudinally relative to the worm, and the said stem passes through a threaded bushing or plug 31 to the outside of the vaporizer-casing, where it is provided with a milled head or wheel, by which it may be operated to control the passage of oil to the vaporizing-chamber. Arranged in the vaporizer-casing, at right angles to the needle-valve 32, is a gudgeon or pin 16, on which is turnably mounted a mutilated gear or segmental pinion 12, which is in mesh with the worm 32 on the stem of the valve 28, said gudgeon or pin having one end mounted in a bearing in the casing and the opposite end mounted in a screw-plug 29, as shown in Fig. 5. The segmental pinion is employed to operate a needle 15, and for this purpose it engages a rack-bar 13, having upper and lower stems 14 working in suitable vertical guides 14', formed in the vaporizer-casing, said upper stem having the needle 15 fixed to it and adapted to work through and maintain clean a small gas-outlet *k* in a plate 18, which is set flush with the top of a threaded nipple 17, screwed into the open top of the vaporizer-casing, and which, with said plate 18, closes said top, said nipple carrying the upper guide 14' and having suitable passages *j* for the flow of gas from the gas-chamber *i* to the aforesaid hole or gas-outlet *k*. Over the plate 18 and threaded plug 17 and screwing upon the upper end of the casing is a cap 34, and to this is fitted a tube with air-ports *l*, controlled by a rotatable sleeve 21 to regulate the air-supply at this point, in the manner well known, as in the ordinary Welsbach-burner construction. Associated with this sleeve is the usual or any desired form of lower and upper burner-casings 21 22, the former having the mixing-chamber 21' and baffle-plates 23 24 25, one of which latter, 24, is provided with a large hole, while the others, 23 and 25, have numerous small holes, as is customary in this type of burner.

Surmounting the casings 21 22 is the usual burner-cap 26, over which, if desired for illuminating purposes, is adjustably suspended by the support 47 a mantle 27. If desired, this mantle and its supporting means may be omitted, as shown in Fig. 2. The vaporizing-tube 19 is bent horizontally over the burner-cap 26, and one of its vertical branches connects with the vaporizing-chamber *f*, while the other branch connects with the gas-chamber *i* through the lateral passage *h*, the connections being herein shown as made by right and left threaded couplings 52 and threaded nipples fixed to the casing.

The operation of the device heretofore described may be briefly stated as follows: When the valve 5 is opened, oil will flow from the lateral passage *b* through the passages *c* and *d* and to the wick 6 in the trough or oil-cup. The lever or finger-piece 9, which forms the cover to the match-hole in the chimney 7 8, is then opened and a lighted match or taper applied to the wick and the resulting flame quickly heats the base of the vaporizer. On turning the milled head on the stem of valve 28 the worm 32 is rotated to operate the segmental gear 12 and rack 13, which causes the needle 15 to move away from its seat in the gas-outlet. At the same time the valve 33 uncovers the oil-passage $p$ and oil will flow thereinto from the passage $g$ and will be delivered through the passage $o$ upon the already-heated floor of the vaporizer-chamber $f$, which results in the oil being instantly vaporized. This vapor rises in the pipe 19 and encircles the burner-cap and then passes down through the pipe 19' and is delivered by the lateral passage $h$ into the interior gas-chamber $i$, from whence it passes by ports $j$ and the gas-outlet $k$ to the mixing-chamber $m$, where it is intimately mixed with air admitted through the openings $l$ and is subdivided and remixed by the baffle-plates 25, 24, and 23 and is finally ignited at the top of the burner-cap and heats to incandescence the mantle.

By the arrangement described and the production of the gas-chamber interior to the vaporizer-section only gas generated in the vaporizer enters the gas-chamber, and the clogging of the gas-outlet $k$ is rendered impossible, because each time the oil-valve is opened or closed the needle 15 is operated through the outlet $k$, thereby thoroughly removing any deposit therein and maintaining said outlet always clean and free for the passage of gas.

Having thus described my invention, what I claim as new, and desire to secure by Letters Patent, is—

1. In a hydrocarbon-burner the combination with an oil-supply and a burner, of a casing having a vaporizing-chamber and an internal gas-chamber; means for supplying oil to said vaporizing-chamber; means for heating the chamber to vaporize said oil; means for connecting the vaporizing-chamber with the gas-chamber; a gas-outlet from the chamber; a needle controlling said outlet; a valve controlling the admission of oil to the vaporizing-chamber; unitary means for operating the needle and uncovering the gas-outlet simultaneously with the admission of oil to the vaporizing-chamber; and an air-supply.

2. In a hydrocarbon-burner the combination with an oil-supply and a burner, of a casing having a vaporizing-chamber and an internal gas-chamber; an oil-supply pipe, and passages leading therefrom to the vaporizing-chamber; means connecting the vaporizing-chamber with the gas-chamber, said gas-chamber having a gas-outlet; a reciprocable needle controlling said outlet and cleansing the same during each reciprocal movement; a valve controlling the oil-passages leading to the vaporizing-chamber; means whereby both valves are operated in unison; a mixing-chamber; and air-admission means thereto.

3. In a hydrocarbon-burner the combination with an oil-supply and a burner, of a casing between the supply and burner and provided with a vaporizing-chamber and an internal gas-chamber, means substantially circumscribing the burner and connecting the vaporizing-chamber with the gas-chamber; a closure for the gas-chamber having a gas-outlet; a needle operating through the gas-outlet and cleansing the walls thereof during the opening and closing movements of the valve; means for supplying oil to the vaporizing-chamber; means for heating the vaporizing-chamber; a valve controlling the flow of oil to the vaporizing-chamber; rack-and-gear connections between the needle and valve whereby said valve and needle open and close in unison; a mixing-chamber interior to the burner; and means for admitting oil thereto.

4. In a hydrocarbon-burner the combination with an oil-supply and a burner having a mixing-chamber and means admitting air thereto, of a casing between the burner and oil-supply said casing having an interior gas-chamber and having a vaporizing-chamber in its lower portion; means substantially circumscribing the burner and connecting the vaporizing-chamber with the gas-chamber; a starting-heater below the casing and discharging the products of combustion against the bottom of the vaporizing-chamber; a closure for the upper end of the gas-chamber provided with a gas-outlet; a needle operable through the gas-outlet to cleanse the walls thereof during each movement of the valve; means for supplying oil to the vaporizing-chamber; a valve controlling the oil supplied to the vaporizing-chamber; and unitary means for actuating the oil-valve and needle in unison.

5. In a hydrocarbon-burner the combination with an oil-reservoir and supply-pipe leading therefrom, of a base-section fitted to the reservoir and having an oil-passage connecting with said pipe said casting having, also, a lateral oil-passage and a surrounding trough containing a wick; means connecting the lateral oil-passage with the trough whereby oil is supplied to the wick; a valve controlling the flow of oil to the wick; an annular chimney rising from the trough and composed of inner and outer foraminous rings, said base-section having a reduced central stem and an air-inlet whereby air is supplied through the inner and outer rings of the chimney; a vaporizing-section fitted to the base-section and including vaporizing and gas chambers and connections therebetween; oil and gas controlling means associated with the vaporizing-section; and a burner-section surmounting the vaporizing-section and communicating with the gas-chamber of the latter.

6. In a hydrocarbon-burner the combination of an oil-reservoir and a supply-pipe; a burner; a vaporizing-section fitted thereto and comprising oil-passages, a vaporizing-chamber, an internal gas-chamber and circulating means substantially circumscribing the burner and connecting with the vaporizing-chamber and gas-chamber, said gas-chamber having a closed top with a diminished gas-outlet leading into the burner; a stem slidably guided in the gas-chamber and provided with a needle which operates through the gas-outlet to cleanse the same during each movement of the stem; a rack-bar on the stem; a valve controlling the oil-passages to the vaporizing-chamber; a worm on the stem of the valve and having a sliding movement relative thereto; a gear interposed between the worm and rack-bar and engaging both whereby the valves have a coördinate movement; and a starting-burner associated with the oil-supply and directing the products of combustion therefrom against the vaporizing-section.

7. In a hydrocarbon-burner, the combination with a burner-section, a vaporizer-section and a starting-burner section each arranged axially in line, said starting-burner section having oil and air supply passages and said vaporizer-section comprising a casing with an internal gas-chamber and a vaporizing-chamber disposed in the path of the products of combustion from the starting-burner, said vaporizer-section having, also, a nipple in its upper end and provided with gas-passages and a plate seating on the nipple and provided with a diminished gas-outlet, a cap connection between the first-named burner-section and said plate, a stem guided in the gas-chamber and provided with a needle which operates through the gas-outlet to free the same from deposit, a rack-bar on the stem, a valve controlling the oil-supply to the vaporizing-chamber, a worm on the oil-valve stem and a segmental gear between the worm and rack whereby the valve and needle operate in unison, and a tube substantially circumscribing the burner-section and having its opposite ends connected respectively to the vaporizing-chamber and gas-chamber.

8. In a hydrocarbon-burner the combination of an oil-reservoir and a supply-pipe; a vaporizer-section having a vaporizing-chamber and an internal gas-chamber with means connecting one with the other, and means controlling the admission of oil to the vaporizing-chamber and the delivery of gas from the gas-chamber; a burner-section surmounting the vaporizer-section; a mantle and means supporting the same relative to the burner; and a base-section having a nipple by which it is fitted to the reservoir, said base-section having an annular wick-containing trough and a reduced central stem having a nipple extension at the upper end by which it is fitted to and in line with the vaporizing-section, said base-section having a central oil-passage connecting with other passages leading to the vaporizing-chamber, and having a lateral passage connecting with passages leading to the trough; a valve controlling the last-named passages; a double-walled chimney rising from the trough and terminating proximate to the bottom wall of the vaporizing-chamber, and the inner and outer walls of the chimney perforated; means in one of said walls to admit a lighter to the wick; and a spring-pressed closure for said opening, said base-section having air-inlets leading to the air-chamber which surrounds the central stem.

9. In a device of the character described the combination with a burner-section including a burner, a mantle and mantle-supporting means; a vaporizer-section axially in line with the burner-section and comprising a vaporizing-chamber and an internal gas-chamber with means connecting one with the other; a needle controlling the outlet from the gas-chamber to the burner and a valve controlling the admission of oil to the vaporizing-chamber, said needle and valve carried by stems arranged one at right angles to the other one of said stems carrying a rack and the other a worm; a segmental gear interposed between the worm and rack whereby unitary means are provided for operating the needle and valve in unison; and a starting-burner axially in line with the vaporizer-section and having valve-controlled oil-passages through it one of which passages connects with the vaporizing-chamber while the other supplies oil to the starting-burner; and means for supplying air to the respective burners.

In testimony whereof I have hereunto set my hand in presence of two subscribing witnesses.

HARRY F. BLANCHARD.

Witnesses:
　WALTER E. ROGERS,
　KATHARINE G. BLANCHARD.